United States Patent
Olesen et al.

(10) Patent No.: US 7,923,648 B2
(45) Date of Patent: Apr. 12, 2011

(54) DRAFT PROTECTION DEVICE FOR A BALANCE AND HAVING A FRICTION REDUCTION DEVICE

(75) Inventors: Neil Olesen, Millington, NJ (US); Felix Holken, Morristown, NJ (US); Sammy Lee, Kunshan (CN)

(73) Assignee: Ohaus Corporation USA, Parsippany, NJ (US)

( * ) Notice: Subject to any disclaimer, the term of this patent is extended or adjusted under 35 U.S.C. 154(b) by 0 days.

(21) Appl. No.: 12/795,241

(22) Filed: Jun. 7, 2010

(65) Prior Publication Data

US 2010/0236840 A1 Sep. 23, 2010

Related U.S. Application Data

(63) Continuation of application No. 11/525,442, filed on Sep. 22, 2006, now Pat. No. 7,732,720, which is a continuation-in-part of application No. 11/357,755, filed on Feb. 17, 2006, now Pat. No. 7,193,164.

(60) Provisional application No. 60/654,568, filed on Feb. 18, 2005.

(51) Int. Cl.
*G01G 21/28* (2006.01)
(52) U.S. Cl. ....................................... 177/180
(58) Field of Classification Search .......... 177/180, 177/181, 239
See application file for complete search history.

(56) References Cited

U.S. PATENT DOCUMENTS

| | | | |
|---|---|---|---|
| 3,703,935 A * | 11/1972 | Hutchinson et al. | 177/124 |
| 4,664,207 A | 5/1987 | Knothe et al. | |
| 4,700,793 A * | 10/1987 | Luchinger | 177/181 |
| 5,170,855 A * | 12/1992 | Kunz et al. | 177/181 |
| 5,298,688 A * | 3/1994 | Luechinger et al. | 177/181 |
| 5,583,322 A * | 12/1996 | Leisinger et al. | 177/180 |
| 5,874,694 A | 2/1999 | Ruedisueli | |
| 6,504,112 B1 | 1/2003 | Luebke et al. | |
| 6,566,614 B1 | 5/2003 | Flückiger et al. | |
| 6,686,545 B2 | 2/2004 | Lüchinger et al. | |
| 6,844,507 B2 | 1/2005 | Leisinger et al. | |
| 6,849,809 B2 | 2/2005 | Lüchinger et al. | |
| 7,193,164 B2 * | 3/2007 | Olesen et al. | 177/180 |
| 7,732,720 B2 * | 6/2010 | Olesen et al. | 177/180 |

* cited by examiner

*Primary Examiner* — Randy W Gibson
(74) *Attorney, Agent, or Firm* — Standley Law Group LLP

(57) ABSTRACT

A draft protection device for a balance and a balance equipped with the draft protection device, wherein the draft protection device includes front and rear panels, two side panels and a top panel, and four posts which are fixedly mounted on a top cover of the balance, and wherein the posts extend vertically. The front and rear panels rest against the posts and are held in place by grooves provided in front and rear top frames which are connected to the top ends of the posts. The side panels are slidable while the front and rear panels are stationary. A friction reduction device mounted in the scale top cover so that the side panels slide along the friction reduction device.

3 Claims, 5 Drawing Sheets

DRAFT PROTECTION DEVICE FOR A BALANCE AND HAVING A FRICTION REDUCTION DEVICE

CROSS-REFERENCE TO RELATED APPLICATIONS

This application claims a right of priority under 35 USC §120 as a continuation of U.S. application Ser. No. 11/525,442, filed 22 Sep. 2006, now U.S. Pat. No. 7,732,720, which is in turn a continuation in part of U.S. application Ser. No. 11/357,755, filed 17 Feb. 2006, now U.S. Pat. No. 7,193,164, which is a non-provisional of U.S. 60/654,568, filed 18 Feb. 2005, now expired. The content of U.S. application Ser. No. 11/525,442 is incorporated by reference as if fully recited herein.

TECHNICAL FIELD

The present invention relates to a friction reduction device for a draft protection device for a balance and to a balance equipped with the friction reduction device for the draft protection device.

BACKGROUND OF THE ART

Draft protection devices for balances are known in the art.
U.S. Pat. No. 5,874,694 discloses a draft shield design. The draft shield is mounted on a top cover of the balance and includes front and rear panels as well as two side panels forming a main chamber, wherein the side panels and a top panel are slidable. However, the panels are not removable without the use of a tool and, therefore, it is not easy to clean the draft shield. The top panel slides on the inside on side rails, so that it is not possible to place an object which is taller and wider than the draft shield into the main chamber of the balance.

In existing draft shield designs, structural stiffness is provided through a rugged back panel or a full frame structure of the slidable top panel.

Furthermore, friction can affect the smooth operation of the sliding panels.

SUMMARY OF THE INVENTION

It is the primary object of the present invention to provide a draft protection device for a balance with slidable side panels and a flip top panel without a top frame being mounted between the sliding panels and the top panel.

Another object of the present invention is to provide the user of the balance with easy access to cleaning all parts of the draft shield.

In accordance with the present invention, the draft protection device is comprised of four posts which are fixedly mounted in the corners of the top cover of the balance, wherein the posts extend vertically. The front and rear panels rest against the rods and are held in place by a groove provided in the top cover of the balance and in top frames mounted in the posts.

Still another object is to provide a friction reduction device that improves the operation of the slidable side panels. This should not interfere with the ability to easily remove the side panels or require the need for special tools.

In accordance with the configuration according to the present invention, a frameless design of the draft protection device allows the user to place an object onto the weighing dish that is taller and wider than the overall height and width of the balance, while still having the advantage of a front and rear protection against any draft influences.

The configuration according to the present invention also makes it possible to provide easy access to all structural components of the draft shield in order to make it possible to clean whole parts of the draft shield. This is made possible by the removable side, front, and back panels as well as the flip top panel.

A friction reduction device is mounted in the scale top cover so that the side panels easily slide along the friction reduction device.

The various features of novelty which characterize the invention are pointed out with particularity in the claims annexed to and forming a part of the disclosure. For a better understanding of the invention, its operating advantages and specific objects attained by its use, reference should be had to the drawing figures and written description in which there are illustrated and described preferred embodiments of the invention.

DETAILED DESCRIPTION OF THE DRAWINGS

Figure 1:
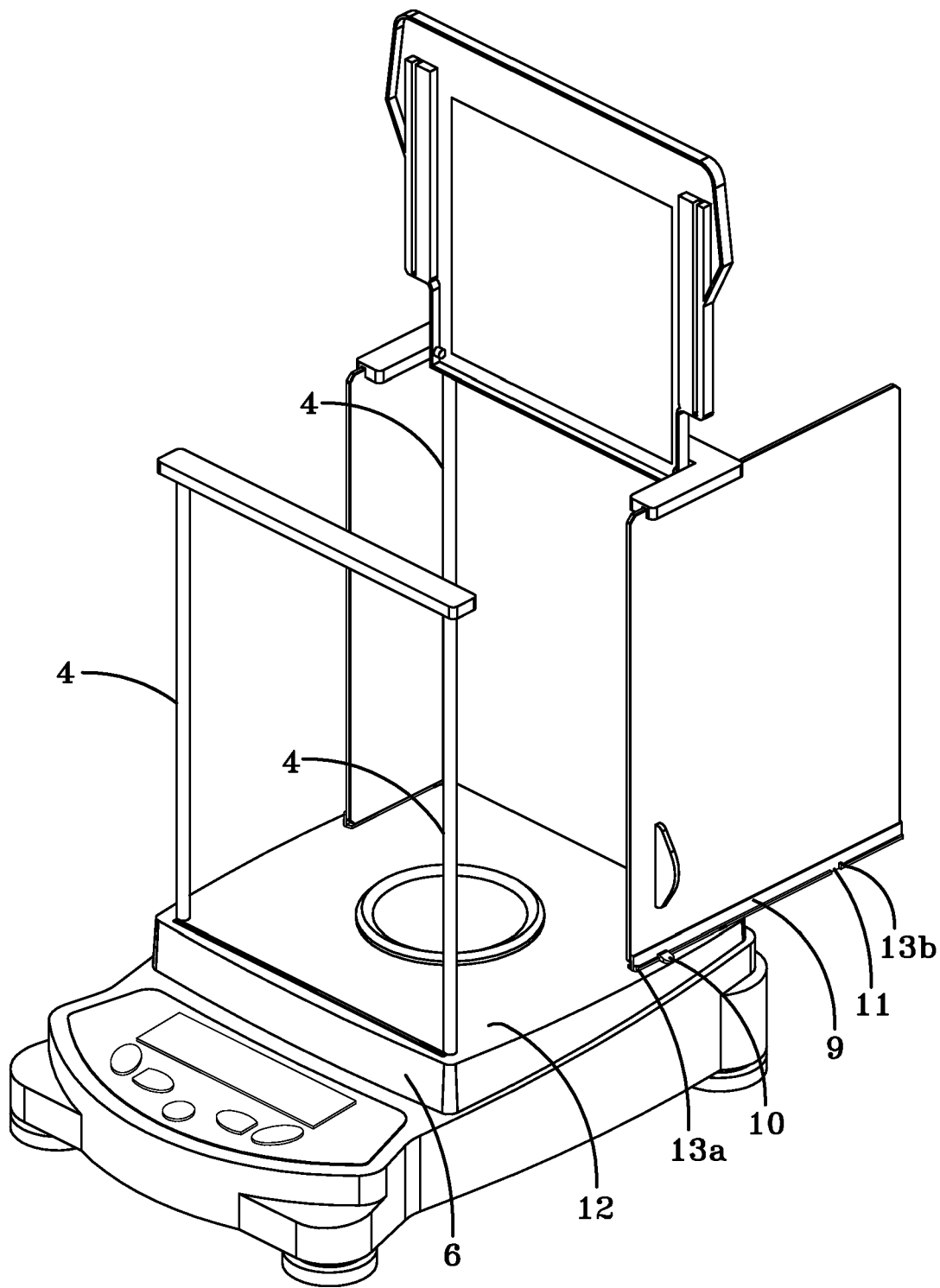
FIG. 1 is a perspective front view of the balance with draft protection device according to the present invention.
Figure 2:
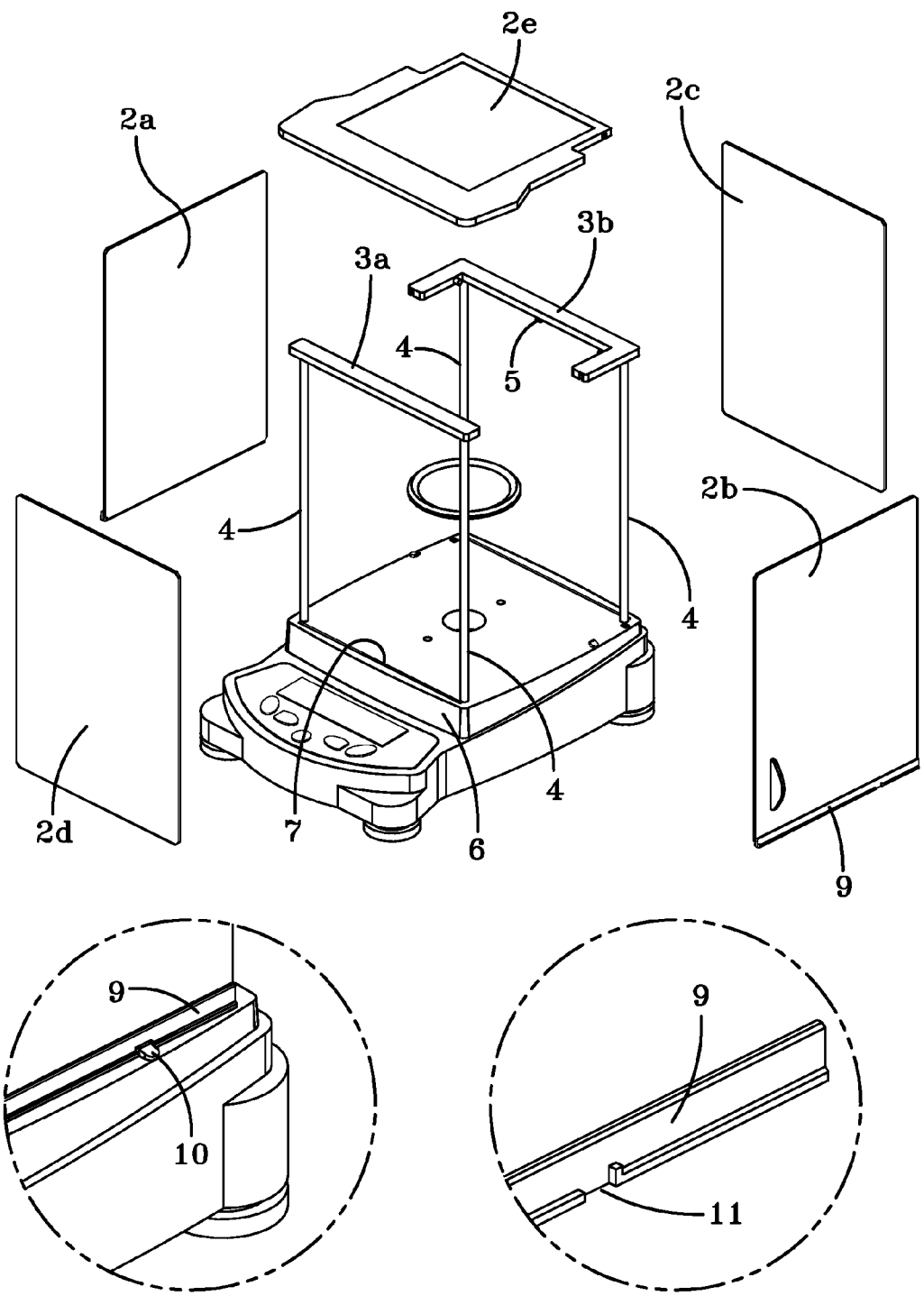
FIG. 2 is an exploded view of the draft protection device and balance of FIG. 1, with the gliders of the side panels and the glider block thereof being shown on a larger scale.
Figure 3:
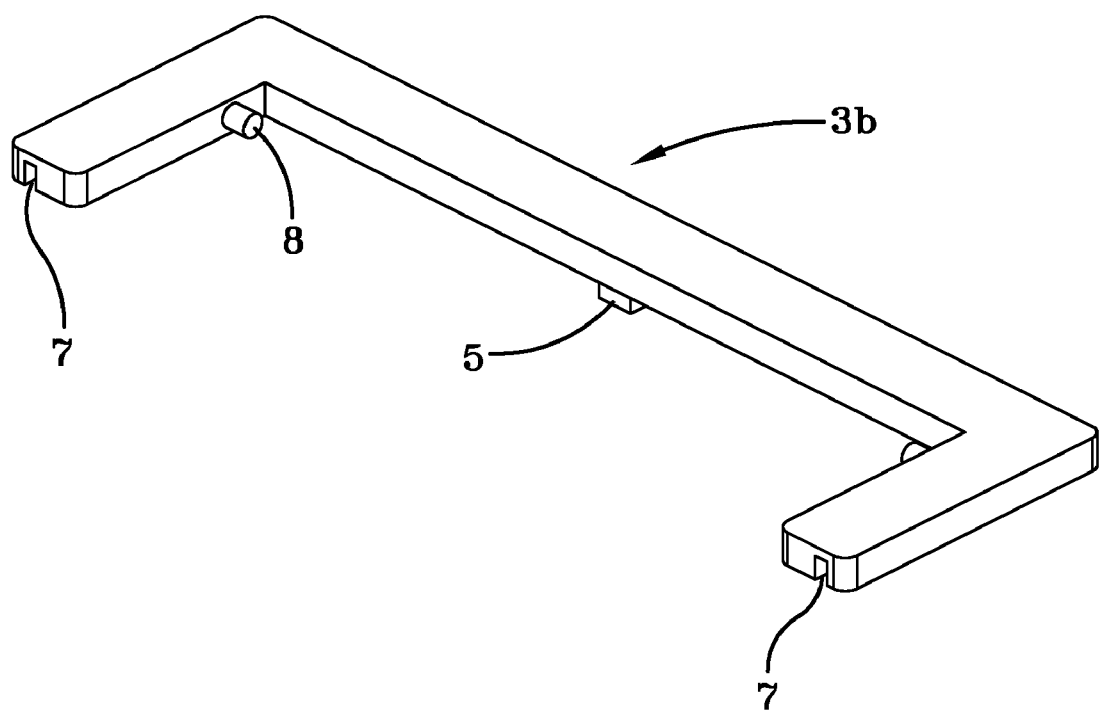
FIG. 3 is a perspective view showing a rear top frame of the draft protection device.

As illustrated in FIGS. 1 through 3, a balance includes a top cover 6 comprised of a sheet metal plate 12 and a weighing dish.

The draft protection device is comprised of vertically extending rods 4 that support the front panel 2d and the rear panel 2c, which panels are not slidable. Side panels 2a and 2b are provided so as to be slidable in a groove 7 in the top frame 3b.

The rods 4 provide the main structural support of the draft protection device which is composed of the panels.

The rods 4 may be of stainless steel or carbon filled plastic material.

As seen in FIG. 2, the front panel 2d is held in place by a front frame member 3a extending across the upper ends of the rods 4 and the rear panel 2c is held in place by a rear top frame 3b which is provided with a clip 5 engaging the panel 2c and by a groove in the scale top cover 6.

In the installed position of the front and rear panels 2d and 2c, the front and rear panels press against the rods 4. This acts as a seal against outside draft disturbances.

The side panels are held in place through grooves 7 in the front and rear top frames 3a and 3b, and by a glider 9, a glider block 10, and a sheet metal plate 12. The sheet metal plate forms the scale top cover 6. The glider 9 is mounted on the side panels 2a and 2b. The glider block 10 is mounted on the scale top cover 6. In the installed position, the two side panels can be moved between front and rear positions. The glider 9 has front and back limit stops 13a and 13b for controlling the travel range of the side panels. When in the closed position, the two side panels are pressed against the rods 4. This also acts as a seal against outside draft disturbances.

In order to be able to remove a side panel, the side panel must be in the closed position thereof. The glider 9 has a notch 11 which allows the side panel while in the closed position to be lifted upwardly into the groove 7 of the respective top frame 3a, 3b and be lifted over the glider block 10. The top panel 2e is a flip top panel which is connected to the rear top frame 3b at hinge points 8 which are shown in FIG. 3.

When in the open position, the flip top panel can be removed by lifting it out of the hinges 8.

Accordingly, the draft protection device can be disassembled by first upwardly moving the flip top panel 2e out of the hinges 8. Then the side panels can be removed by lifting the side panels so as to engage deeper into the grooves 7 of the respective top frame 3a or 3b. This allows the glider 9 to be moved through the notch 11 and to lift the side panel over the glider block 10.

Then the front and rear panels can be removed by actuating the clips 5 and releasing the respective front and rear panels.

Figure 4:
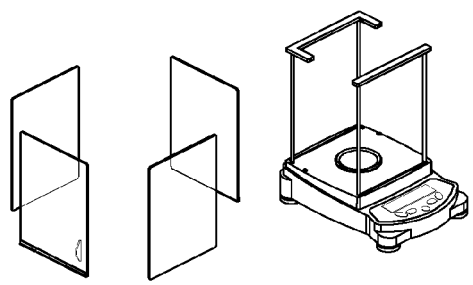
FIG. 4 is a diagram showing the assembly of the draft protection device.
Figure 4:
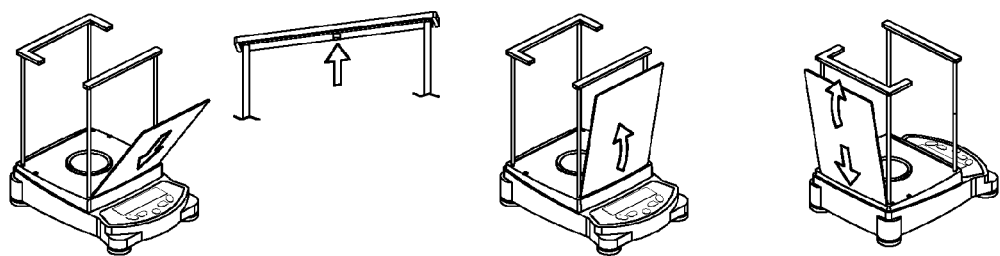
Figure 4:
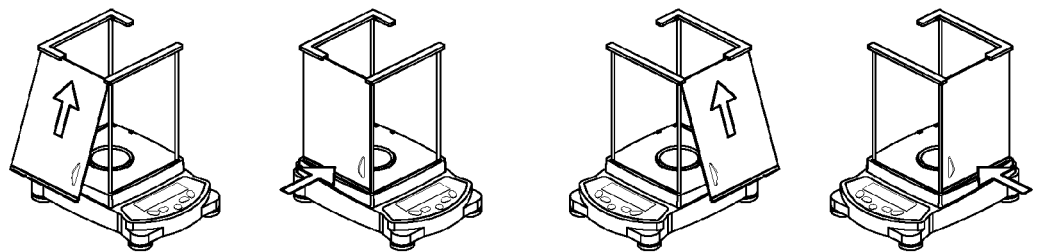

The sequence of assembling the draft protection device is schematically illustrated in FIG. 4 of the drawing figures.

Figure 5:
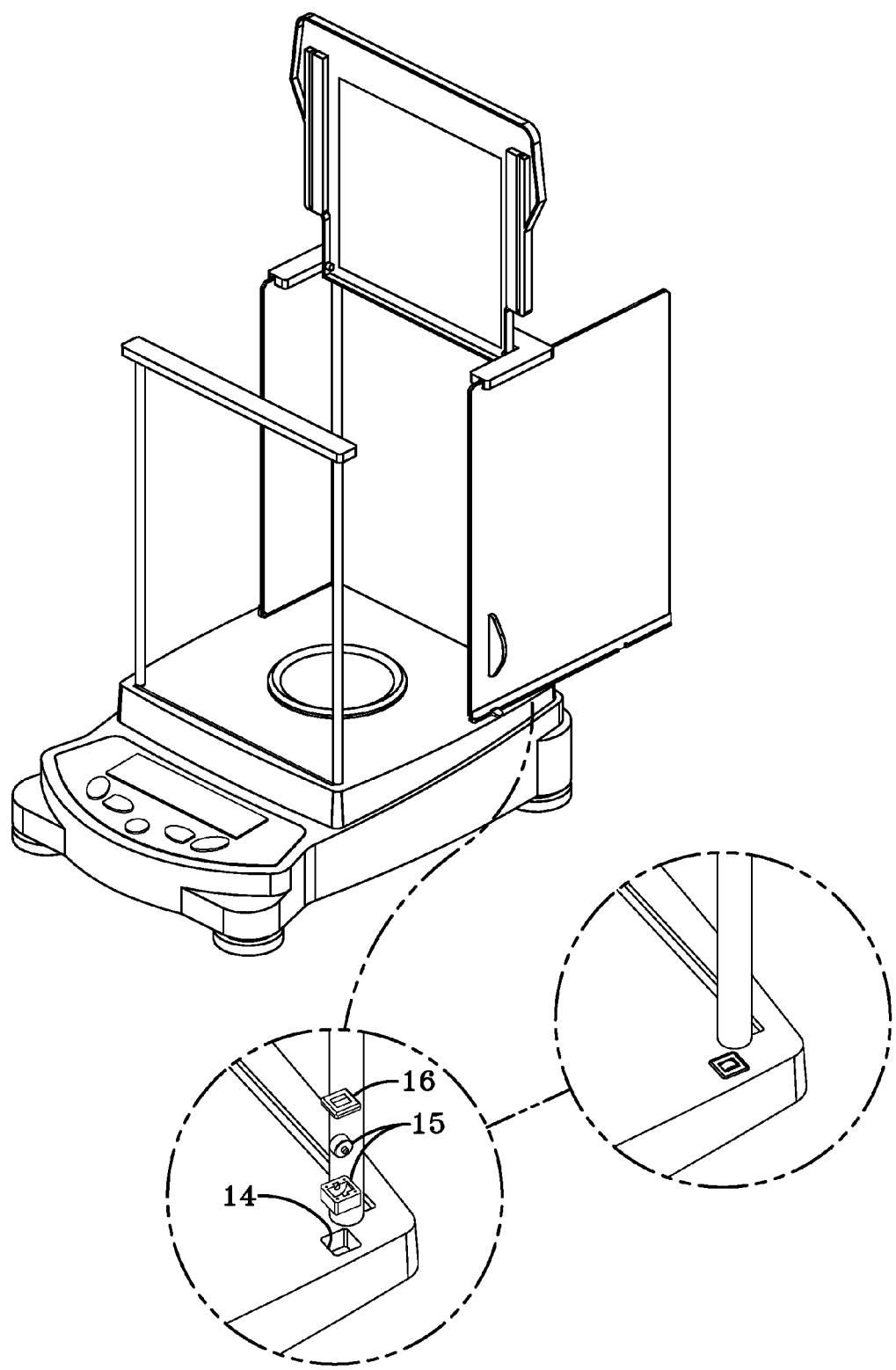
FIG. 5 is a view as in FIG. 1 showing the friction reduction device.

As shown in FIG. 5, the friction reduction device is mounted near the rear of the top cover 6 to insure smooth operation of the sliding side panels. The friction reduction device 14, 15, 16 supports the weight of the door as the door panel is moved to the rear. By reducing friction the side panels require less force to move throughout its path of travel.

The top cover 6 has a cut-out 14 into which an anti-friction device 15 is inserted. The anti-friction device 15 can be a fixed wear pad made of a low friction material or a roller made of a suitable material, such as plastic or metal. The roller can include a cover 16 to prevent dirt from collecting around the roller. Although the friction reduction device illustrated in the drawing includes a roller, in certain instances the use of a wear pad may be advantageous since no moving parts are needed.

By providing either the roller or the wear pad the side panels can easily slide without the need of much force.

While specific embodiments of the invention have been shown and described in. detail to illustrate the inventive principles, it will be understood that the invention may be embodied otherwise without departing from such principles.

What is claimed is:

1. A device for weighing a sample, comprising:
   a balance having a housing with a rectangular top cover, a weighing dish of the balance arranged above the top cover for receiving the sample;
   a front frame assembly, comprising:
      a pair of front rods that extend vertically upward from the front corners of the top cover; and
      a first top frame portion that joins the front rods at a top end of each;
   a rear frame assembly, comprising:
      a pair of rear rods that extend vertically upward from the rear corners of the top cover; and
      a second top frame portion that joins the rear rods at a top end of each, the second top frame portion further having a first and a second arm, each arm extending from the top end of a respective rear rod towards the top end of the corresponding front rod;
   a top panel, hingedly connected to the second top frame portion;
   front and rear panels, engagingly received in the respective front and rear frame assemblies; and
   a pair of side panels, slidingly engaged in the arms of the second top frame portion.

2. The weighing device of claim 1, further comprising:
   a friction device mounted in the housing top cover surface so that the side panels slide therealong.

3. The weighing device of claim 2, further comprising:
   a roller, arranged in a cut-out in the housing top cover surface, such that the side panel engaging the roller is slidable thereon.

\* \* \* \* \*

UNITED STATES PATENT AND TRADEMARK OFFICE
CERTIFICATE OF CORRECTION

| | | |
|---|---|---|
| PATENT NO. | : 7,923,648 B2 | Page 1 of 1 |
| APPLICATION NO. | : 12/795241 | |
| DATED | : April 12, 2011 | |
| INVENTOR(S) | : Olesen et al. | |

It is certified that error appears in the above-identified patent and that said Letters Patent is hereby corrected as shown below:

IN THE CLAIMS:

In column 4, line 31, claim 2, please delete "surface".

In column 4, line 35, claim 3, please delete "surface".

Signed and Sealed this
Tenth Day of May, 2011

David J. Kappos
*Director of the United States Patent and Trademark Office*